(12) United States Patent
Kim et al.

(10) Patent No.: US 11,225,265 B2
(45) Date of Patent: Jan. 18, 2022

(54) ELECTRONIC DEVICE AND METHOD FOR RECOGNIZING OBJECT USING PLURALITY OF SENSORS

(71) Applicant: Samsung Electronics Co., Ltd., Gyeonggi-do (KR)

(72) Inventors: Myung-sik Kim, Gyeonggi-do (KR); Mi-young Kim, Gyeonggi-do (KR); Bo-seok Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 37 days.

(21) Appl. No.: 16/500,316

(22) PCT Filed: Mar. 27, 2018

(86) PCT No.: PCT/KR2018/003581
§ 371 (c)(1),
(2) Date: Oct. 2, 2019

(87) PCT Pub. No.: WO2018/186617
PCT Pub. Date: Oct. 11, 2018

(65) Prior Publication Data
US 2021/0101609 A1  Apr. 8, 2021

(30) Foreign Application Priority Data

Apr. 3, 2017  (KR) .......................... 10-2017-0043094

(51) Int. Cl.
*B60Q 1/00* (2006.01)
*B60W 50/14* (2020.01)
(Continued)

(52) U.S. Cl.
CPC ......... *B60W 50/14* (2013.01); *G06K 9/00805* (2013.01); *G08G 1/166* (2013.01)

(58) Field of Classification Search
CPC .... B60W 50/14; G08G 1/166; G06K 9/00805
See application file for complete search history.

(56) References Cited

U.S. PATENT DOCUMENTS 5,646,612 A  * 7/1997 Byon ...................... B60K 28/10
                                                340/903
6,388,580 B1 * 5/2002 Graham ................... G08G 1/166
                                                340/903
(Continued)

FOREIGN PATENT DOCUMENTS

JP       3963119      6/2007
JP     2007-210403    8/2007
(Continued)

OTHER PUBLICATIONS

International Search Report dated Jul. 5, 2018 issued in counterpart application No. PCT/KR2018/003581, 26 pages.
(Continued)

*Primary Examiner* — Munear T Akki
(74) *Attorney, Agent, or Firm* — The Farrell Law Firm, P.C.

(57) ABSTRACT

Provided are a method and apparatus for controlling a vehicle by recognizing an object near the vehicle. The method may include: obtaining first sensing data regarding the object near the vehicle, from a first sensor; obtaining second sensing data regarding the object, from a second sensor; obtaining a first object recognition possibility of a driver regarding the object and a second object recognition possibility regarding the object, based on the first sensing data, the second sensing data, and characteristics of the first sensor and the second sensor; obtaining a degree of risk of the object, based on the first object recognition possibility and the second object recognition possibility; and performing a certain function of the vehicle, based on the degree of risk of the object.

20 Claims, 11 Drawing Sheets

(51) Int. Cl.
*G06K 9/00* (2006.01)
*G08G 1/16* (2006.01)

(56) References Cited

U.S. PATENT DOCUMENTS

| | | | |
|---|---|---|---|
| 6,708,099 B2 | 3/2004 | Tellis et al. | |
| 6,724,300 B2 | 4/2004 | Miyakoshi et al. | |
| 6,789,015 B2* | 9/2004 | Tsuji | G06T 7/20 |
| | | | 701/301 |
| 7,069,146 B2 | 6/2006 | Yamamura et al. | |
| 7,468,933 B2* | 12/2008 | Sugiura | B60R 21/013 |
| | | | 340/436 |
| 7,586,400 B2* | 9/2009 | Nagaoka | B60W 50/14 |
| | | | 340/425.5 |
| 7,667,581 B2* | 2/2010 | Fujimoto | G06K 9/00369 |
| | | | 340/436 |
| 7,772,968 B2* | 8/2010 | Lin | B60Q 1/48 |
| | | | 340/435 |
| 8,082,101 B2* | 12/2011 | Stein | G06K 9/00805 |
| | | | 701/301 |
| 8,199,046 B2* | 6/2012 | Nanami | G01S 13/867 |
| | | | 342/52 |
| 2002/0135469 A1* | 9/2002 | Nakamura | F16H 61/16 |
| | | | 340/436 |
| 2006/0229793 A1* | 10/2006 | Sawamoto | B60T 7/22 |
| | | | 701/96 |
| 2011/0199197 A1* | 8/2011 | Takatsudo | G06K 9/00805 |
| | | | 340/425.5 |

FOREIGN PATENT DOCUMENTS

| | | |
|---|---|---|
| JP | 2009-083743 | 4/2009 |
| JP | 2012-058827 | 3/2012 |
| JP | 2012058827 A * | 3/2012 |
| JP | 5316785 | 10/2013 |
| KR | 1020130026933 | 3/2013 |
| KR | 1020130113088 | 10/2013 |

OTHER PUBLICATIONS

Korean Office Action dated May 21, 2021 issued in counterpart application No. 10-2017-0043094, 11 pages.
Korean Office Action dated Oct. 21, 2021 issued in counterpart application No. 10-2017-0043094, 6 pages.

* cited by examiner

ELECTRONIC DEVICE AND METHOD FOR RECOGNIZING OBJECT USING PLURALITY OF SENSORS

PRIORITY

This application is a National Phase Entry of PCT International Application No. PCT/KR2018/003581 which was filed on Mar. 27, 2018, and claims priority to Korean Patent Application No. 10-2017-0043094, which was filed on Apr. 3, 2017, the content of each of which is incorporated herein by reference.

TECHNICAL FIELD

The present disclosure relates to an electronic device and method for recognizing an object by using a plurality of sensors, and more particularly, to an apparatus and method for determining a degree of risk of an object recognized through a plurality of sensors and performing a certain function of a vehicle, based on the degree of risk.

BACKGROUND ART

A general object recognizing technology uses only one sensor. When a single sensor is used, there is a case in which recognition is difficult using only the single sensor (for example, in the case of an image sensor, visibility is limited at night or during bad weather) due to an environment in which recognition accuracy of a sensor is low. In this regard, recently, a method of recognizing an object by using a plurality of sensors has been provided. When the object is recognized by using the plurality of sensors, a degree of risk of a situation to a driver of a vehicle varies based on object recognition of each sensor, based on characteristics of each sensor. When the degree of risk of the situation is determined on a consistent basis without considering the object recognition by each of the plurality of sensors, it is difficult to effectively notify the driver of the vehicle of the degree of risk of the object.

DESCRIPTION OF EMBODIMENTS

Technical Problem

The present disclosure aims at differently warning a driver of a vehicle or enabling the driver of the vehicle to directly control the vehicle, based on whether a first sensor and a second sensor recognize an object.

BEST MODE

Figure 1:
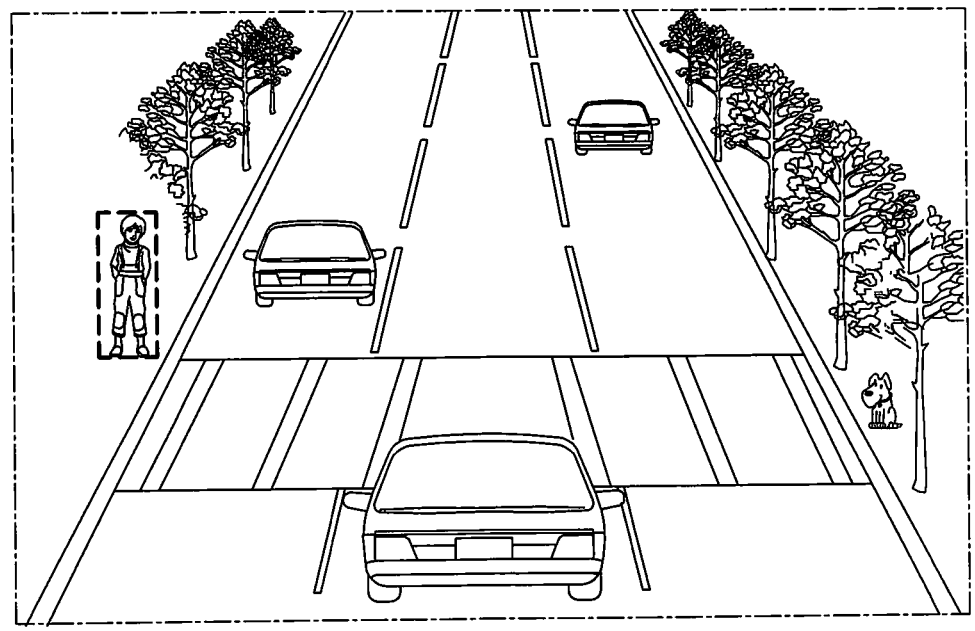
FIG. 1 is a diagram showing an example of a vehicle including an apparatus for recognizing an object, according to an embodiment of the present disclosure.
Figure 1:
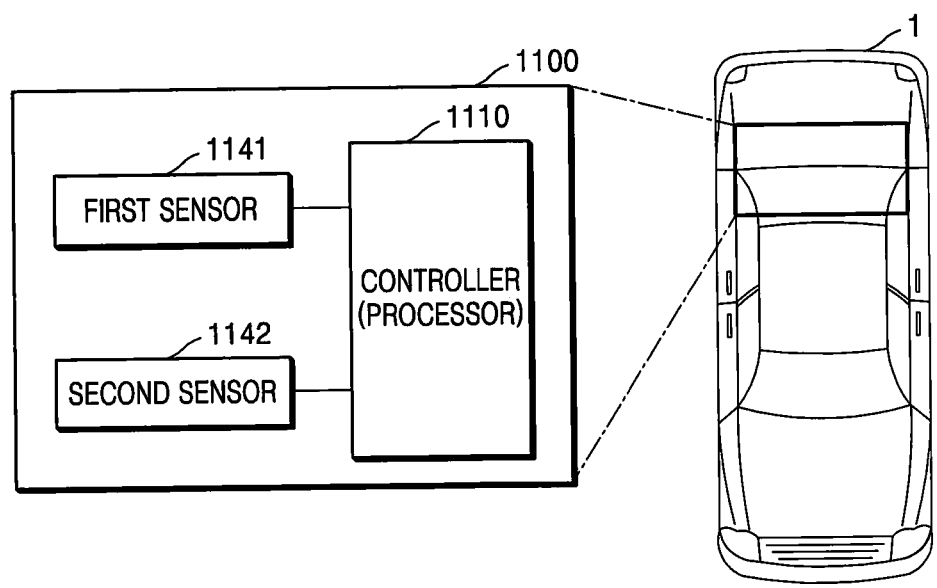

According to an aspect of the present disclosure, method of controlling a vehicle by recognizing, by the vehicle, an object near the vehicle, the method includes: obtaining first sensing data regarding the object near the vehicle, from a first sensor; obtaining second sensing data regarding the object, from a second sensor; obtaining a first object recognition possibility of a driver regarding the object and a second object recognition possibility regarding the object, based on the first sensing data, the second sensing data, and characteristics of the first sensor and the second sensor; obtaining a degree of risk of the object, based on the first object recognition possibility and the second object recognition possibility; and performing a certain function of the vehicle, based on the degree of risk of the object.

According to another aspect of the present disclosure, an apparatus for controlling a vehicle by recognizing, by the vehicle, an object near the vehicle, the apparatus includes: a first sensor configured to obtain first sensing data regarding the object near the vehicle; a second sensor configured to obtain second sensing data regarding the object; a controller configured to obtain a first object recognition possibility of a driver regarding the object and a second object recognition possibility regarding the object, based on the first sensing data, the second sensing data, and characteristics of the first sensor and the second sensor, obtain a degree of risk of the object, based on the first object recognition possibility and the second object recognition possibility, and perform a certain function of the vehicle, based on the degree of risk of the object.

MODE OF DISCLOSURE

Embodiments of the present disclosure will now be described more fully with reference to the accompanying drawings to be easily implemented by one of ordinary skill in the art. However, the present disclosure may be embodied in many different forms, and should not be construed as being limited to the embodiments set forth herein. In the drawings, parts that are not related to the description are omitted for clear description of the present disclosure, and like reference numerals in the drawings denote like elements throughout the specification.

In the specification, when a region is "connected" to another region, the regions may not only be "directly connected", but may also be "electrically connected" via another device therebetween. Also, when a part "includes" or "comprises" an element, unless there is a particular description contrary thereto, the part may further include other elements, not excluding the other elements.

Hereinafter, the present disclosure will be described in detail with reference to accompanying drawings.

FIG. 1 is a diagram showing an example of a vehicle 1 including an apparatus for recognizing an object, according to an embodiment of the present disclosure.

As shown in FIG. 1, an apparatus 1100 according to an embodiment of the disclosure may recognize an object near the vehicle 1 including the apparatus 1100, by using a first sensor and a second sensor. Meanwhile, the apparatus 1100 may include a controller 1110, a first sensor 1141, and a second sensor 1142.

The first sensor 1141 and the second sensor 1142 may respectively obtain first sensing data and second sensing data. The controller 1110 may obtain a first object recognition possibility and a second object recognition possibility of the first sensing data and the second sensing data, considering characteristics of each sensor. The controller 1110 may obtain object recognition possibilities of the first sensing data and the second sensing data. The controller 1110 may obtain a degree of risk of an object located near the vehicle 1, based on the object recognition possibilities of the first sensing data and the second sensing data. The controller 1110 may perform a certain function, for example, warn a driver of the vehicle 1 about the presence of an object nearby, based on the obtained degree of risk of the object, or directly control the vehicle 1 to avoid risk due to the nearby object.

According to an embodiment, when the vehicle 1 is running a road, there may be a person, a speed bump, a street tree, or an animal near the vehicle 1, and a plurality of sensors recognizing nearby objects may be included in the vehicle 1. An object near the vehicle 1 may be recognized or may not be recognized based on a type of a sensor.

According to an embodiment, the plurality of sensors may be identified as the first sensor 1141 that detects an area within a range of human cognitive and perceptual ability (for example, vision, auditory, or the like) or the second sensor 1142 that detects an area outside the range of human cognitive and perceptual ability. For example, the first sensor 1141 that detects the area within the range of human cognitive and perceptual ability may include an RGB camera and a microphone, but is not limited thereto. Also, for example, the second sensor 1142 that detects the area outside the range of human cognitive and perceptual ability may include an infrared ray (IR) camera, a thermal image camera, a light detection and ranging (LIDAR) sensor, a radar sensor, an ultrasound sensor, and an IR sensor, but is not limited thereto.

Alternatively, according to an embodiment, the plurality of sensors may be identified as an image sensor or a distance sensor. The image sensor is a sensor that identifies an object by using visible ray, IR, a temperature, or the like, and may include an RGB camera, an IR camera, or a thermal image camera, but is not limited thereto. Data obtained from the RGB camera may be an x, y pixel value and an image (visible ray). Data obtained from the IR camera may be an x, y pixel value and an image (IR value). Data obtained from the thermal image camera may be an x, y pixel value and an image (temperature value). Also, the distance sensor is a sensor for measuring a distance from an object, and may include a LIDAR sensor, a radar sensor, an ultrasound sensor, or an IR sensor, but is not limited thereto. Data obtained from the LIDAR sensor may be a distance, an azimuth, a height, a three-dimensional (3D) image (surface property), or a metal/nonmetal (physical property). Data obtained from the radar sensor may be a distance, an azimuth, a speed (moving speed), a metal/nonmetal/moving object (physical property). Data obtained from the ultrasound sensor may be a distance (azimuth) or information about presence of an object. Data obtained from the IR sensor may be a distance or information about presence of an object.

For example, when the vehicle 1 is running a bright road, the first sensor 1141 that detects the area within the range of human cognitive and perceptual ability and the second sensor 1142 that detects the area outside the range of human cognitive and perceptual ability may both recognize an object. In this case, even when there is an object in front of the vehicle 1, the driver of the vehicle 1 is able to recognize the object, and thus a degree of risk of the object may be relatively low. Accordingly, a point of time when the certain function of the vehicle 1 is performed according to the degree of risk of the object may be adjusted according to the driver of the vehicle 1.

The apparatus 1100 may be included in a vehicle, a drone, a cleaning robot, or a pet robot, but is not limited thereto, and may be included in any type of device capable of recognizing an object by using at least one sensor. Also, the object may denote any object recognizable by a sensor. For example, the object may be a pedestrian (a child), a pedestrian (an adult), a vehicle (a bus, a sedan, an SUV, a van, a truck, a trailer, a forklift, or a car), a two-wheeled vehicle (a person riding a bicycle or a person on a motorbike), an animal (a dog, a cat, a deer, or a bird), a tree, a sensor (a temperature sensor, a carbon dioxide sensor, a sprinkler), a wall, a speed bump, or excrement, but is not limited thereto.

The object recognition possibility may denote a value determined based on similarity based on a shape, a color, or the like of a sensed image. Also, the object recognition possibility may denote a value determined through a feature extracted from input data and a parameter of a data base. Also, the object recognition possibility may be determined based on a type of a sensor and an external condition of the vehicle 1.

According to an embodiment, when a reference value of the object recognition possibility is different according to sensors, the reference value of the object recognition possibility may be corrected according to a predetermined standard to obtain a common recognition possibility. For example, the common recognition possibility may indicate the reference value of the object recognition possibility applicable to all of the RGB camera, the IR camera, thermal image camera, the LIDAR sensor, the radar sensor, the ultrasound sensor, the IR sensor, and the like.

Figure 2:
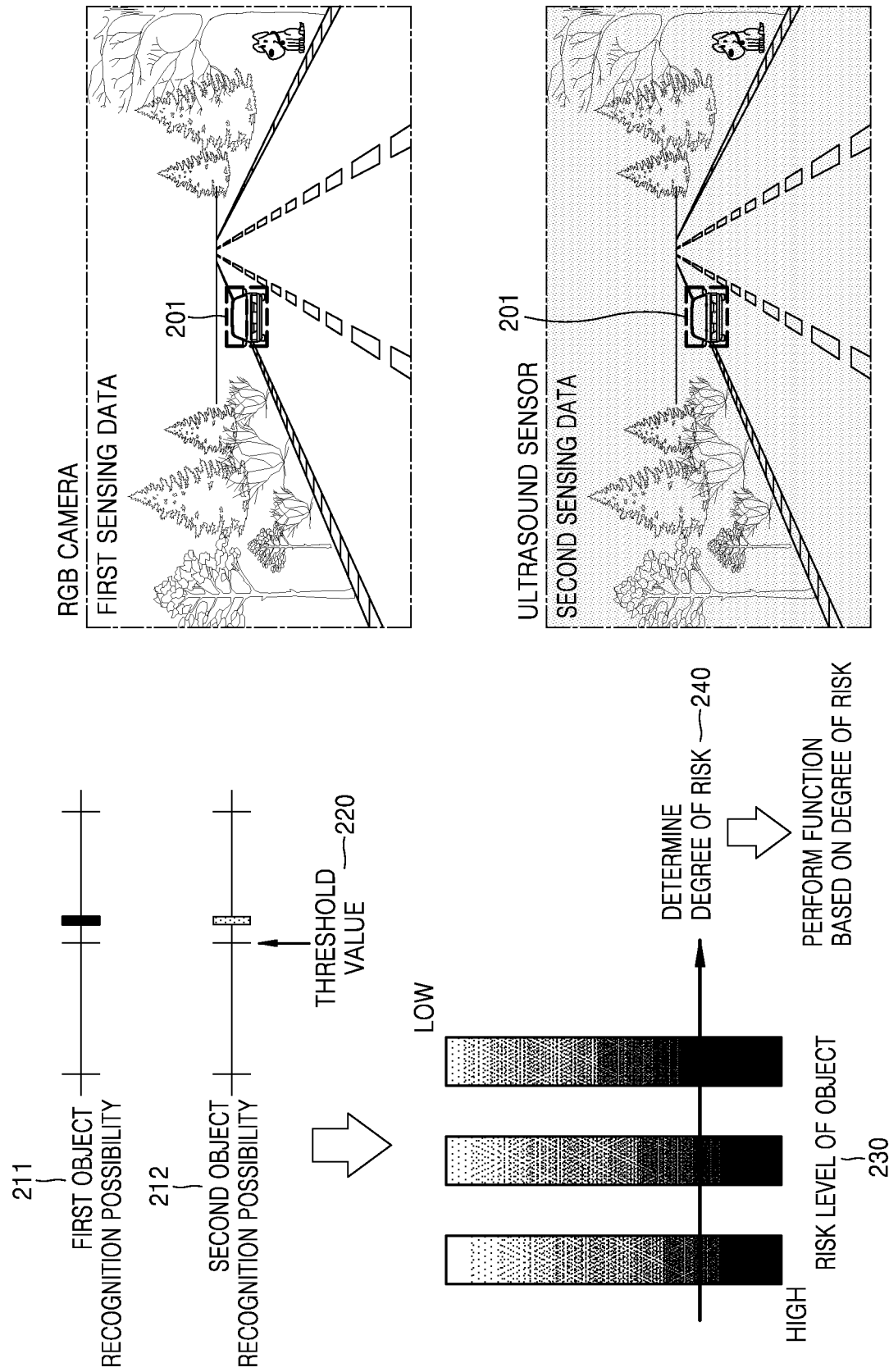
FIG. 2 is a diagram showing an example in which a risk level of an object is determined based on an object recognition possibility of sensing data and a degree of risk of the object is determined based on the risk level of the object, according to an embodiment of the present disclosure.

FIG. 2 is a diagram showing an example in which a risk level of an object is determined based on an object recognition possibility of sensing data and a degree of risk of the object is determined based on the risk level of the object, according to an embodiment of the present disclosure.

For example, when the vehicle 1 is running a bright road, the first sensor that detects the area within the range of human cognitive and perceptual ability and the second sensor that detects the area outside the range of human cognitive and perceptual ability may both recognize an object 201.

Meanwhile, when the vehicle 1 is running a dark road where a nearby object is difficult to be identified with naked eyes, the first sensor 1141 that detects the area within the range of human cognitive and perceptual ability may not be able to recognize the object near the vehicle 1 and the second sensor that detects the area outside the range of human cognitive and perceptual ability may recognize the object, within a certain range.

According to an embodiment, a first object recognition possibility 211 of first sensing data obtained from the first sensor 1141 is compared with a threshold value 220, and when the first object recognition possibility 211 of the first sensing data is equal to or greater than the threshold value 220, it may be determined that the first sensor 1141 recognized the object 201. Also, a second object recognition possibility 212 of second sensing data obtained from the second sensor 1142 is compared with the threshold value 220, and when the second object recognition possibility 212 of the second sensing data is equal to or greater than the threshold value 220, it may be determined that the second sensor 1142 recognized the object 201. In other words, it may be determined whether the object 201 is recognized by a sensor by determining whether an object recognition possibility of sensing data obtained from the sensor is equal to or greater than the threshold value 220.

According to an embodiment, after it is determined whether the object is recognized by the sensor, a risk level 230 of the object may be obtained based on the recognition.

For example, when the first object recognition possibility is equal to or greater than the threshold value 220 and the second object recognition possibility is equal to or greater than the threshold value 220, the driver of the vehicle 1 may be aware of the presence of the object near the vehicle 1 and the sensor of the vehicle 1 may also have recognized the presence of the object. In this case, a degree of risk caused by the presence of the object near the vehicle 1 is obvious, and thus the degree of risk may be determined at a relatively low standard, i.e., a relatively low risk level.

Also, when the first object recognition possibility is equal to or greater than the threshold value 220 and the second object recognition possibility is smaller than the threshold value 220, the driver of the vehicle 1 may be aware of the presence of the object near the vehicle 1, but the second sensor that detects the area outside the range of human cognitive and perceptual ability among the sensors of the vehicle 1 may have not recognized the object near the vehicle 1. In this case, even when the second sensor did not recognize the object, the driver of the vehicle 1 is able to directly recognize the object, and thus the degree of risk may be determined at an intermediate standard, i.e., an intermediate risk level.

Also, when the first object recognition possibility is smaller than the threshold value 220 and the second object recognition possibility is equal to or greater than the threshold value 220, it may be difficult for the driver of the vehicle 1 to recognize the object near the vehicle 1, but the second sensor that detects the area outside the range of human cognitive and perceptual ability may have recognized the object near the vehicle 1. In this case, because the driver is unable to identify the object with the perceptual ability despite that the second sensor detected the object near the vehicle 1, the degree of risk may be determined at a relatively high level, i.e., a relatively high risk level.

According to an embodiment, the degree of risk 240 may be determined, based on the risk level 230 obtained as such.

For example, when a degree of risk is determined under a same condition of a running environment (for example, a running speed, a road condition, the weather, a driver's skill, and the like), a degree of risk determined at a relatively low risk level may be lower than a degree of risk determined at a relatively high risk level. In other words, different degrees of risk may be determined according to risk levels determined based on recognition of a sensor, even under same conditions of surrounding environment and running environment (for example, a running speed, a road condition, the weather, a driver's skill, and the like).

According to an embodiment, a certain function of the vehicle 1 may be performed based on the determined degree of risk. For example, the certain function of the vehicle 1 may include at least one of a function of outputting notification information notifying about a risk due to the object and a function of controlling movement of the vehicle 1.

According to an embodiment, when a relatively low degree of risk is determined, a risk to the driver of the vehicle 1 is relatively low, and thus warning about the object 201 or controlling movement of the vehicle 1 may be performed at a pre-set reference time, a type of warning may be limited, or the intensity or frequency of the warning may be relatively low.

For example, when a pre-set warning time on the object is 50 m ahead of the vehicle 1 and a pre-set control time of the vehicle 1 is 30 m ahead of the vehicle 1, and when the determined degree of risk is low, a warning about the object may occur when the object reaches 40 m ahead of the vehicle 1 and the vehicle 1 may be controlled when the object reaches 20 m ahead of the vehicle 1. Also, for example, when a pre-set warning time on the object is set to 5 seconds before reaching the object ahead and a pre-set control time of the vehicle 1 is set to 4 seconds before reaching the object ahead, and when the determined degree of risk is low, a warning about the object may occur from 4 seconds before reaching the object ahead and the vehicle 1 may be controlled from 3 seconds before reaching the object ahead.

On the other hand, according to an embodiment, when a relatively high degree of risk is determined, a risk to the driver of the vehicle 1 is relatively significant, and thus warning about the object or controlling movement of the vehicle 1 may be performed before the pre-set reference time, a type of warning may be various, or the intensity or frequency of the warning may be relatively high For example, when a pre-set warning time on the object 201 is 50 m ahead of the vehicle 1 and a pre-set control time of the vehicle 1 is 30 m ahead of the vehicle 1, and when the determined degree of risk is high, a warning about the object may occur when the object reaches 80 m ahead of the vehicle 1 and the vehicle 1 may be controlled when the object reaches 50 m ahead of the vehicle 1. Also, for example, when a pre-set warning time on the object is set to 5 seconds before reaching the object ahead and a pre-set control time of the vehicle 1 is set to 4 seconds before reaching the object ahead, and when the determined degree of risk is high, a warning about the object may occur from 8 seconds before reaching the object ahead and the vehicle 1 may be controlled from 5 seconds before reaching the object ahead.

Figure 3:
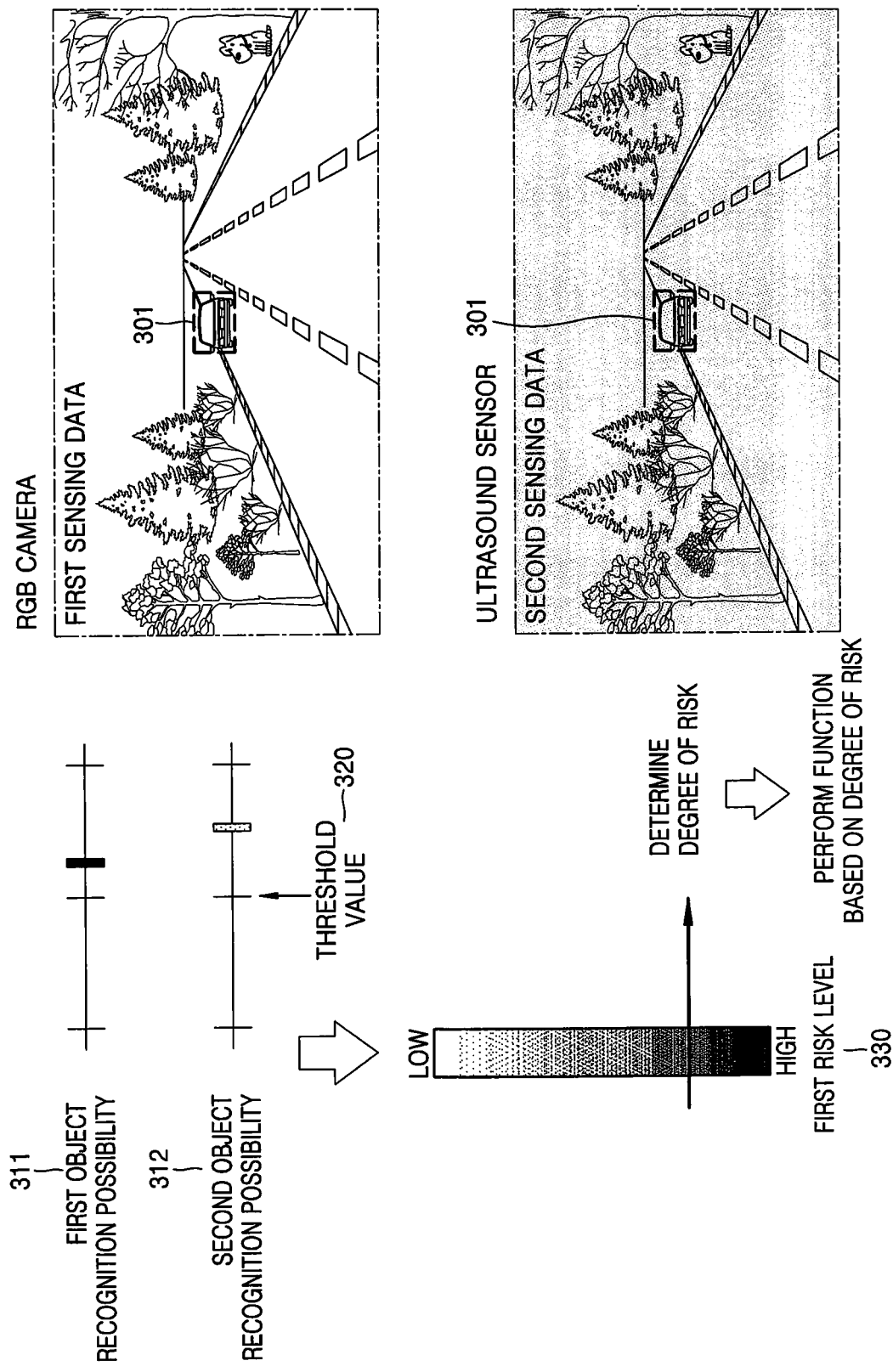
FIG. 3 is a diagram showing an example in which, when a first sensor and a second sensor both recognize an object, a degree of risk is determined based on a first risk level and a certain function of a vehicle is performed, according to an embodiment of the present disclosure.

FIG. 3 is a diagram showing an example in which, when the first sensor and the second sensor both recognize an object, a degree of risk is determined based on a first risk level 330 and a certain function of the vehicle 1 is performed, according to an embodiment of the present disclosure.

According to an embodiment, the first sensor 1141 that detects the area within the range of human cognitive and perceptual ability and the second sensor 1142 that detects the area outside the range of human cognitive and perceptual ability may both recognize an object 301. For example, when the vehicle 1 is riding a bright road, sensors of the vehicle 1 may all recognize the object 301. For example, the sensors of the vehicle 1 may recognize another vehicle 1 or a speed bump ahead, or recognize an animal or a street tree near the vehicle 1.

According to an embodiment, a first object recognition possibility 311 and a second object recognition possibility 312 are determined to be equal to or greater than a threshold value 320 when the first sensor and the second sensor recognize the object 301. Here, the threshold value 320 may be a value indicating that accuracy or possibility of sensing data is equal to or greater than a certain standard. For example, when an object recognition possibility of sensing data is equal to greater than the threshold value 320, the controller 1110 of the apparatus 1100 may determine that a sensor did not recognize the object. Meanwhile, the threshold value 320 may be a pre-set value or may be a corrected value based on at least one of surrounding situation information or running information.

According to an embodiment, when it is determined that both the first object recognition possibility 311 and the second object recognition possibility 312 are equal to or greater than the threshold value 320, it is highly likely for the driver of the vehicle 1 to recognize the object near, the vehicle 1, and thus a relatively low risk level (i.e., the first risk level 330) may be determined. For example, the first risk level 330 may be relatively lower than a second risk level or a third risk level described later.

According to an embodiment, when a degree of risk is determined based on the same surrounding situation information and running information, a degree of risk determined based on the first risk level 330 may be lower than a degree of risk determined based on the second risk level. However, the degree of risk determined based on the first risk level 330 may not be necessarily lower than the degree of risk determined based on the second risk level, and a degree of risk determined based on the first risk level and determined when the surrounding situation information and the running information are riskier to the vehicle 1 may be higher than a degree of risk determined based on the second risk level and determined when the surrounding situation information and the running information are safer to the vehicle 1.

According to an embodiment, when the degree of risk is determined based on the first risk level, the certain function of the vehicle 1 may be performed based on the determined degree of risk. For example, when the determined degree of risk is low, a risk to the vehicle 1 or the driver of the vehicle 1 is not urgent, and thus warning about the object or controlling movement of the vehicle 1 may be performed at a pre-set reference time, a type of warning may be limited, or the intensity or frequency of the warning may be relatively low.

Figure 4:
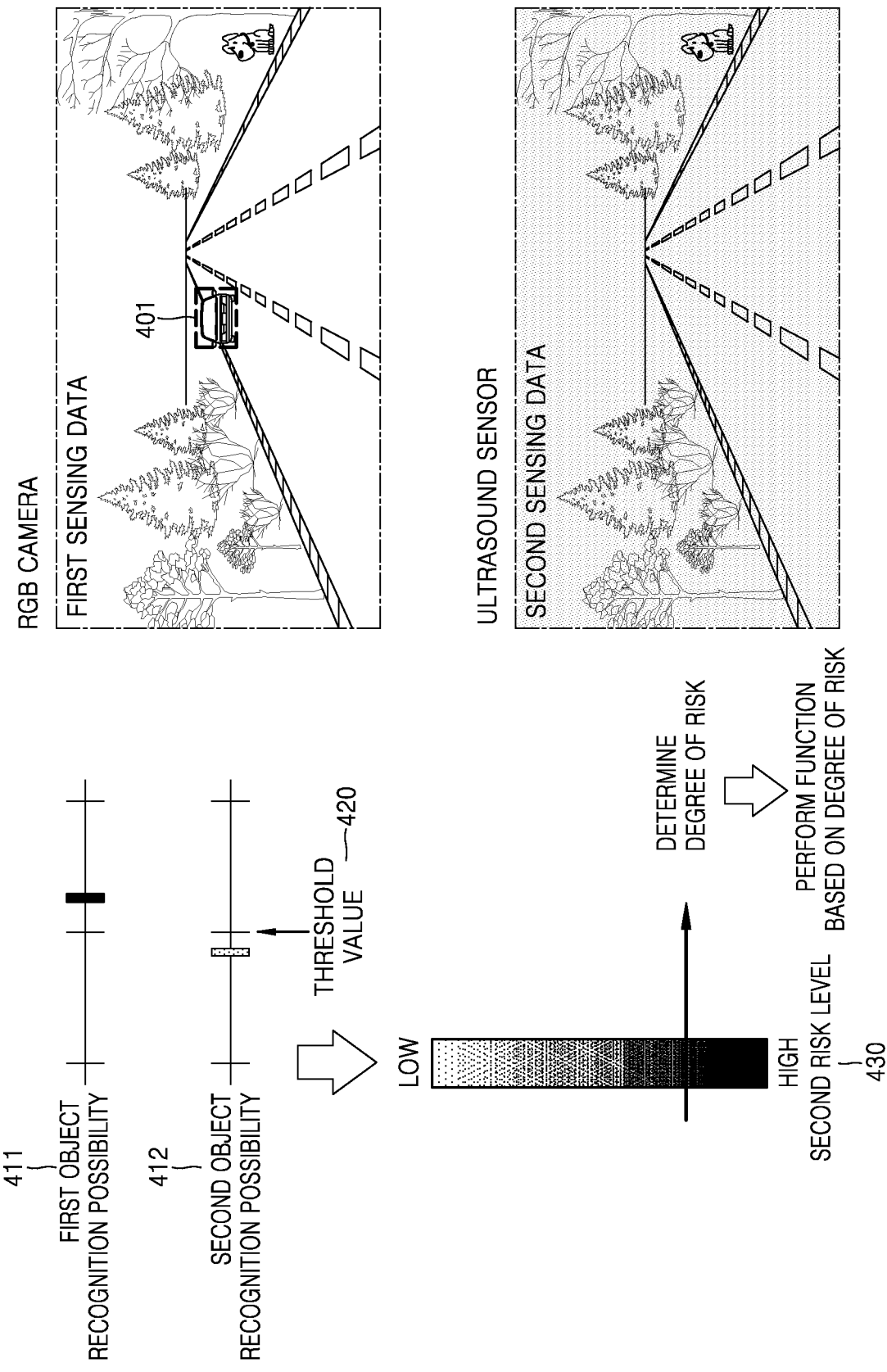
FIG. 4 is a diagram showing an example in which, when a first sensor recognizes an object and a second sensor 1142 does not recognize the object, a degree of risk is determined based on a second risk level and a certain function of a vehicle is performed, according to an embodiment of the present disclosure.

FIG. 4 is a diagram showing an example in which, when the first sensor 1141 recognizes an object and the second sensor 1142 does not recognize the object 401, a degree of risk is determined based on a second risk level 430 and a certain function of the vehicle 1 is performed, according to an embodiment of the present disclosure.

According to an embodiment, the first sensor 1141 that detects the area within the range of human cognitive and perceptual ability may recognize the object 401, but the second sensor 1142 that detects the area outside the range of human cognitive and perceptual ability may not recognize the object. For example, when the vehicle 1 is passing a corner or a tunnel, an RGB camera of the vehicle 1 may recognize the object and an ultrasound sensor of the vehicle 1 may not recognize the object. Also, for example, when the vehicle 1 is running in the rain, the RGB camera of the vehicle 1 may recognize the object 401 and a LIDAR sensor of the vehicle 1 may not recognize the object 401.

According to an embodiment, when a first object recognition possibility is equal to or greater than a threshold value 420 and a second object recognition possibility is smaller than the threshold value 420, the first sensor 1141 may have recognized the object 401 and the second sensor 1142 may not have recognized the object. Here, the threshold value 420 may be a value indicating that accuracy or possibility of sensing data is equal to or greater than a certain standard. For example, when an object recognition possibility of sensing data is smaller than the threshold value 420, the controller 1110 of the apparatus 1100 may determine that a sensor did not recognize the object. Meanwhile, the threshold value 420 may be a pre-set value or may be a corrected value based on at least one of surrounding situation information or running information.

According to an embodiment, when the first object recognition possibility is determined to be equal to or greater than the threshold value 420 and the second object recognition possibility is determined to be smaller than the threshold value 420, an intermediate risk level (i.e., a second risk level 430) that is higher than a relatively low risk level (i.e., a first risk level) and lower than a relatively high risk level (i.e., a third risk level) may be determined. For example, the second risk level 430 may be relatively lower than the third risk level to be described later and relatively higher than the first risk level 330 described above.

According to an embodiment, when a degree of risk is determined based on the same surrounding situation information and running information, a degree of risk determined at the second risk level 430 may be lower than a degree of risk determined at the third risk level and higher than a degree of risk determined at the first risk level 330. However, the degree of risk determined based on the second risk level 430 may not be necessarily lower than the degree of risk determined based on the third risk level, and the degree of risk determined based on the second risk level 430 and determined when the surrounding situation information and the running information are riskier to the vehicle 1 may be higher than the degree of risk determined based on the third risk level and determined when the surrounding situation information and the running information are safer to the vehicle 1.

According to an embodiment, when the degree of risk is determined based on the second risk level 430, the certain function of the vehicle 1 may be performed based on the determined degree of risk. For example, when the determined degree of risk is low, a risk to the vehicle 1 or the driver of the vehicle 1 is not urgent, and thus warning about the object or controlling movement of the vehicle 1 may be performed at a pre-set reference time, a type of warning may be limited, or the intensity or frequency of the warning may be relatively low. Meanwhile, the pre-set reference regarding occurrence of the warning about the object or the controlling movement of the vehicle 1, the type of warning, the intensity of warning, or the frequency of warning may be changed via user setting.

Figure 5:
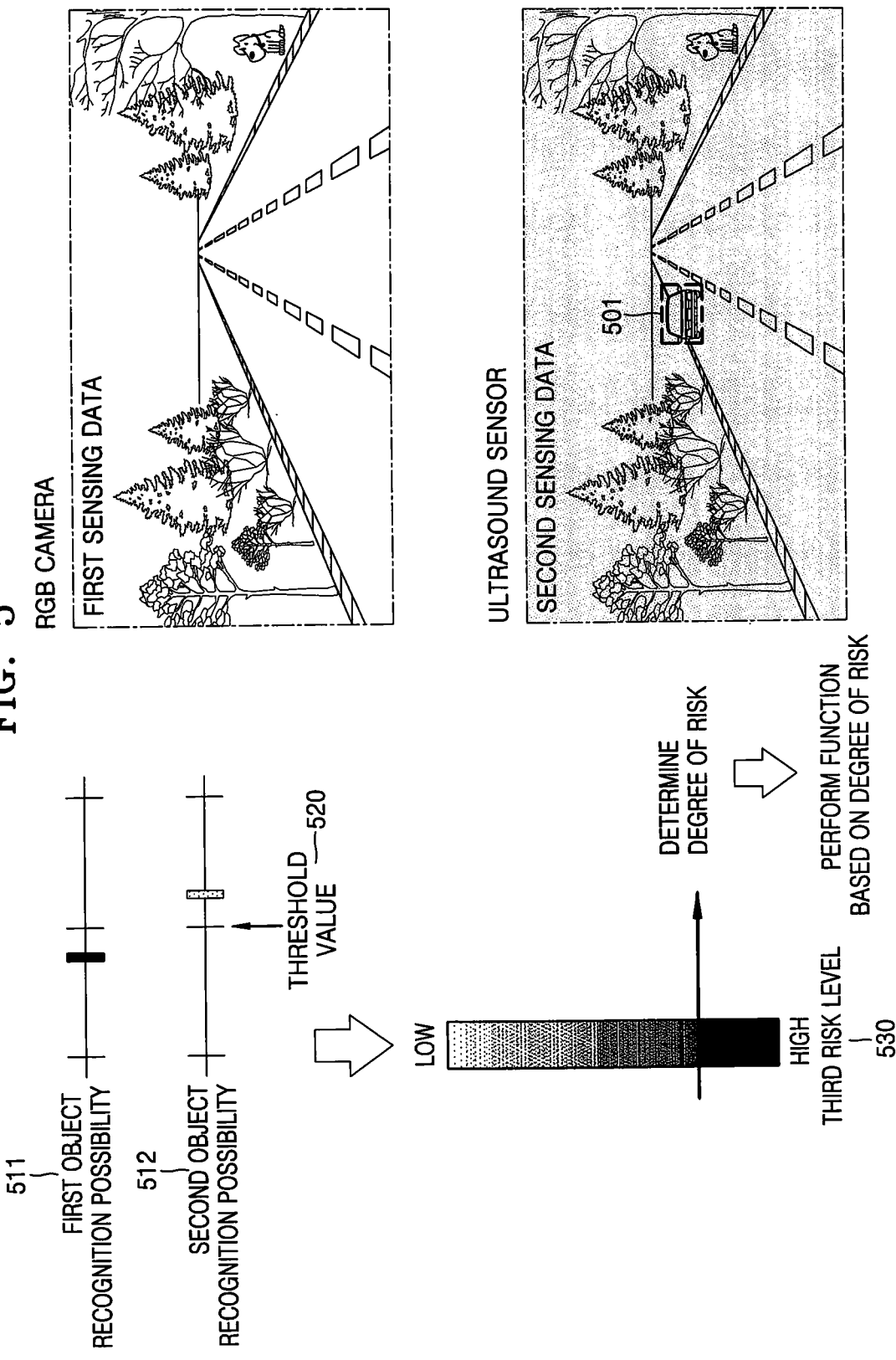
FIG. 5 is a diagram showing an example in which, when a first sensor does not recognize an object and a second sensor recognizes the object, a degree of risk is determined based on a third risk level and a certain function of a vehicle is performed, according to an embodiment of the present disclosure.

FIG. 5 is a diagram showing an example in which, when the first sensor 1141 does not recognize an object and the second sensor 1142 recognize the object, a degree of risk is determined based on a third risk level 530 and a certain function of the vehicle 1 is performed, according to an embodiment of the present disclosure.

According to an embodiment, the first sensor 1141 that detects the area within the range of human cognitive and perceptual ability may not recognize the object and the second sensor 1142 that detects the area outside the range of human cognitive and perceptual ability may recognize the object 501. For example, when the vehicle 1 moves from a dark tunnel to a bright place, an RGB camera may not recognize the object due to an instantaneous change in illumination but an ultrasound sensor may recognize the object.

According to an embodiment, when a first object recognition possibility is smaller than a threshold value 520 and a second object recognition possibility is equal to or greater than the threshold value 520, the first sensor 1141 may not have recognized the object and the second sensor 1142 may have recognized the object. Here, the threshold value 520 may be a value indicating that accuracy or possibility of sensing data is equal to or greater than a certain standard. Meanwhile, the threshold value 520 may be a pre-set value or may be a corrected value based on at least one of surrounding situation information or running information.

According to an embodiment, when it is determined that the first object recognition possibility 511 is smaller than the threshold value 520 and the second object recognition possibility 512 is equal to or greater than the threshold value 520, the driver of the vehicle 1 is less likely to recognize an object near the vehicle 1, and thus a relatively high risk level (i.e., the third risk level 530) may be determined. For example, the third risk level 530 may be relatively higher than the first risk level and the second risk level described above.

According to an embodiment, when a degree of risk is determined based on the same surrounding situation information and running information, a degree of risk determined based on the third risk level 530 may be higher than the degree of risk determined based on the first risk level. However, the degree of risk determined based on the third risk level 530 may not be necessarily higher than the degree of risk determined based on the second risk level 430, and the degree of risk determined based on the second risk level 430 and determined when the surrounding situation information and the running information are riskier to the vehicle 1 may be higher than the degree of risk determined based on the third risk level 530 and determined when the surrounding situation information and the running information are safer to the vehicle 1.

According to an embodiment, when the degree of risk is determined based on the third risk level 530, the certain function of the vehicle 1 may be performed based on the determined degree of risk. For example, when the determined degree of risk is high, a risk to the vehicle 1 or the driver of the vehicle 1 is urgent, and thus warning about the object or controlling movement of the vehicle 1 may be performed before the pre-set reference time, a type of warning may be various, or the intensity or frequency of the warning may be relatively high.

FIGS. 2 through 5 illustrate embodiments, and thus the present disclosure is not limited thereto.

Figure 6:
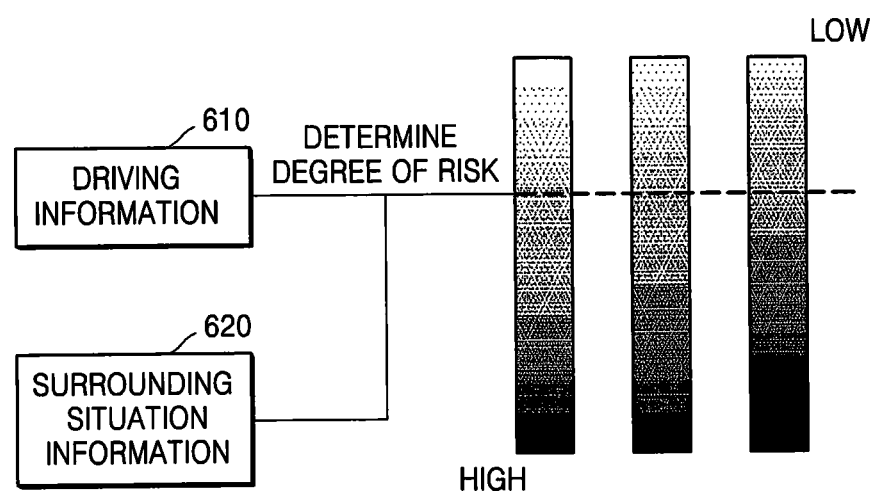
FIG. 6 is a diagram showing an example in which a degree of risk of an object is determined based on a risk level and at least one of running information of a vehicle and surrounding situation information of around the vehicle, according to an embodiment of the present disclosure.

FIG. 6 is a diagram showing an example in which a degree of risk of an object is determined based on a risk level and at least one of running information of the vehicle 1 and surrounding situation information of around the vehicle 1, according to an embodiment of the present disclosure.

According to an embodiment, the controller 1110 of the apparatus 1100 of the vehicle 1 may obtain at least one of the running information 610 of the vehicle 1 and the surrounding situation information 620 of the vehicle 1.

For example, the running information 610 of the vehicle 1 may include a speed of the vehicle 1 (for example, a running speed, a running acceleration, sudden stop, rapid acceleration, and the like), steering of the vehicle 1 (for example, a running direction and the like), information of the vehicle 1 (for example, information about a type, a model year, an accident rate, and the like of the vehicle 1), a normal driving habit of the driver (for example, a reaction speed and the like of the driver), a degree of caution of the driver (for example, a visual field of the driver, a direction the driver is watching, and the like), or the like, but is not limited thereto.

Also, for example, the surrounding situation information 620 of the vehicle 1 may be a lane type of a road the vehicle is running, presence of another vehicle 1 in a surrounding lane, illumination, an amount of snowfall, an amount of rainfall, a tunnel environment, or a corner environment, but is not limited thereto.

According to an embodiment, the controller 1110 of the apparatus 1100 of the vehicle 1 may determine the degree of risk of the object, based on the determined risk level and at least one of the running information 610 of the vehicle 1 and the surrounding situation information 620 of the vehicle 1.

For example, even when the running information 610 and the surrounding situation information 620 are the same, different degrees of risk may be determined when risk levels determined based on object recognition of a sensor are different. Also, even when a risk level is the same, different degrees of risk may be determined when the running information and the surrounding situation information are different.

According to an embodiment, the controller 1110 may determine a risk level based on whether an object is recognized, and determine a degree of risk on the object considering at least one of the running information 610 of the vehicle 1 or the surrounding situation information 620 of the vehicle 1, based on the determined risk level. On the other hand, the controller may obtain the running information 610 of the vehicle 1 and the running information 610 of the vehicle 1, and determine the degree of risk on the object considering the risk level, based on the obtained running information 610 or surrounding situation information 620 of the vehicle 1.

Figure 7:
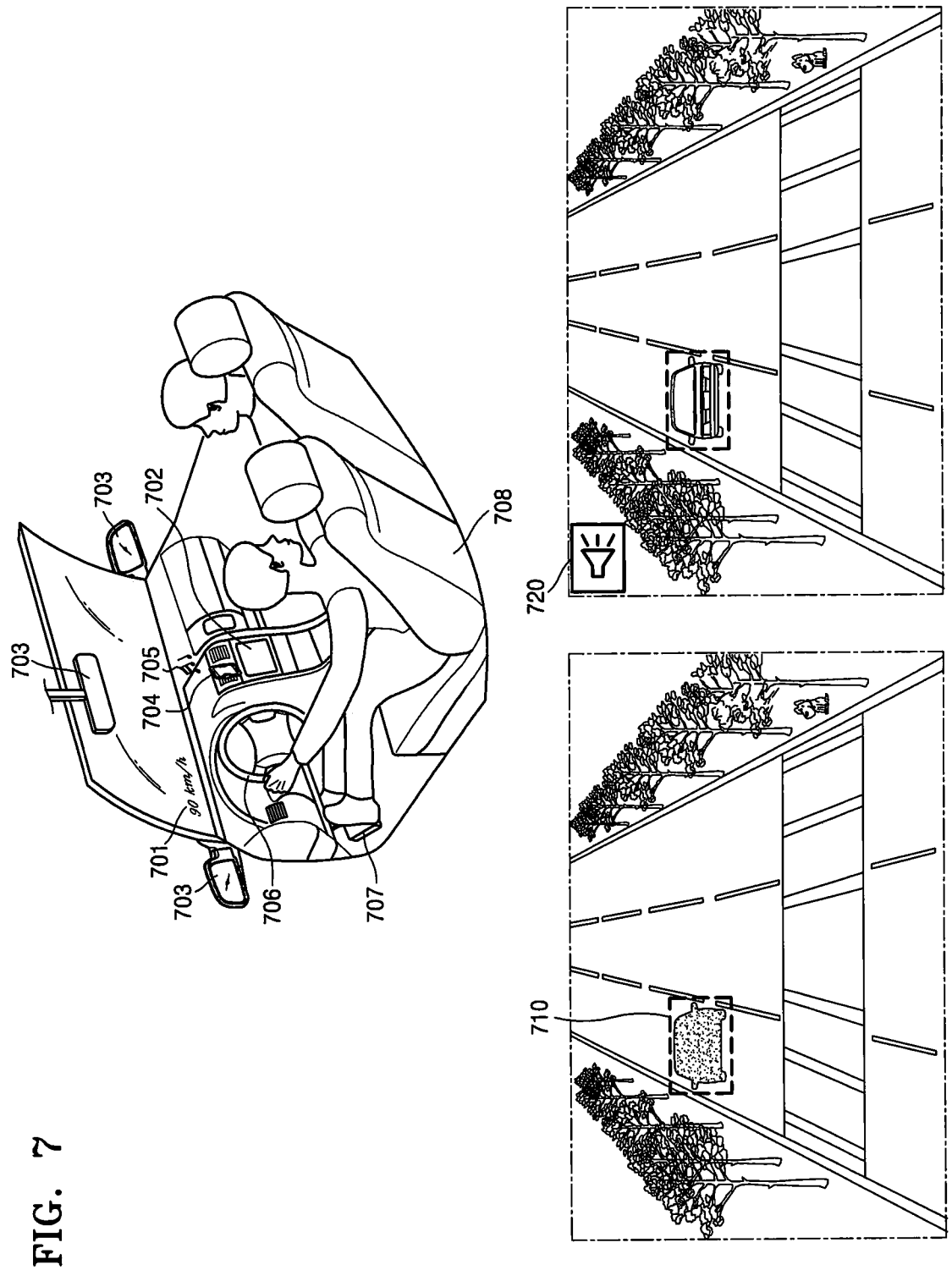
FIG. 7 is a diagram showing an example of a function of outputting notification information notifying about a risk due to an object and a function of controlling movement of a vehicle, the functions included in a certain function of the vehicle, according to an embodiment of the present disclosure.

FIG. 7 is a diagram showing an example of a function of outputting notification information notifying about a risk due to an object and a function of controlling movement of the vehicle 1, the functions included in a certain function of the vehicle 1, according to an embodiment of the present disclosure.

According to an embodiment, the controller 1110 of the apparatus 1100 may output a warning about the object to a head-up display 701, a central information display (CID) 702, a mirror display 703, or a display of a device 704 connected via a communicator. Also, the controller 1110 of the apparatus 1100 may output the warning about the object as sound 705 via a sound outputter. Also, the controller 1110 of the apparatus 1100 may output the warning about the object as vibration. For example, the vibration may be generated at a steering wheel 706, a brake paddle 707, a seat 708 of a driver.

According to an embodiment, when information about the object is output to a display, the information may be output via different methods based on a type of a sensor that recognized the object. For example, when an RGB sensor did not recognize the object and only an ultrasound sensor recognized the object, the information about the object output to the display may have pre-set different shapes 710. For example, the controller 1110 of the apparatus 1100 may assign a color of a displayed form based on a degree of risk of the object or may output a heat map such that degrees of risk of the vehicle 1 are distinguished. Alternatively, for example, the controller 1110 of the apparatus 1100 may output the degree of risk of the object in a number. For example, when the RGB sensor did not recognize the object and only the ultrasound sensor recognized the object, a sound shape icon 720 may be displayed on the display to indicate a sound alert.

According to an embodiment, the function of controlling movement of the vehicle 1 may include a function of decelerating a speed of the vehicle 1 or a function of changing steering of the vehicle 1, but is not limited thereto.

The controller 1110 of the apparatus 1100 may control a running operation including at least one of a running speed and a running direction of the vehicle 1, based on running guide information. For example, the controller 1110 may stop the vehicle 1 suddenly by operating a brake to prevent a collision risk situation. Also, the controller 1110 may change the running direction to prevent the collision risk situation.

Figure 8:
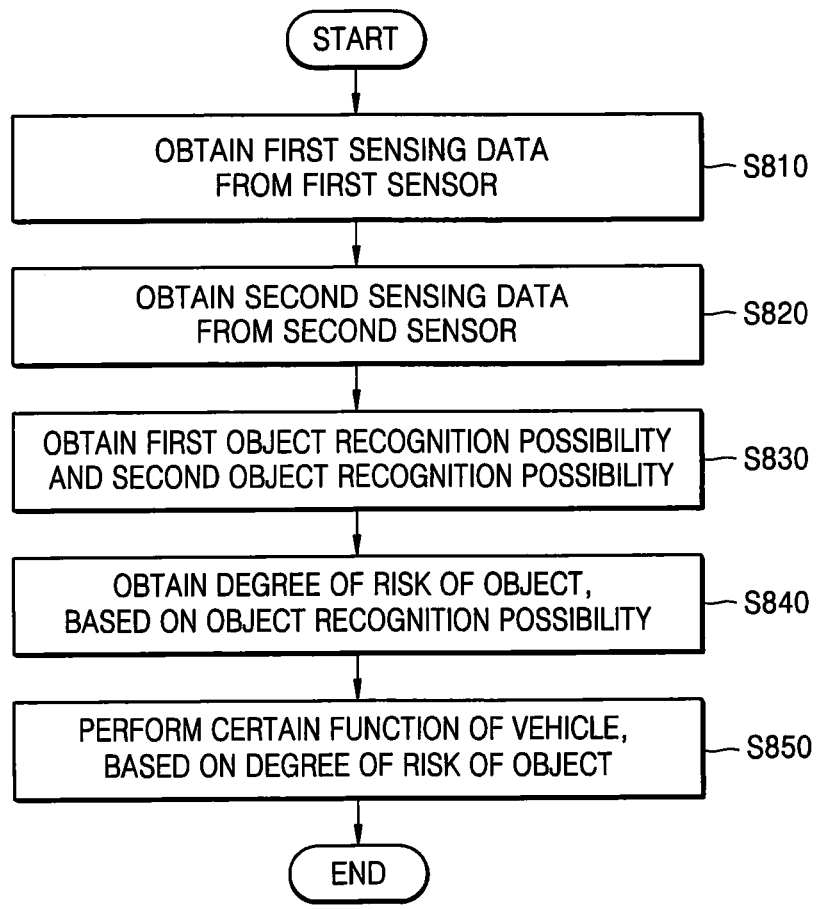
FIG. 8 is a flowchart of a method of obtaining a degree of risk of an object, based on an object recognition possibility, and performing a certain function with respect to a vehicle, based on the degree of risk of the object, according to an embodiment of the present disclosure.

FIG. 8 is a flowchart of a method of obtaining a degree of risk of an object, based on an object recognition possibility, and performing a certain function with respect to the vehicle 1, based on the degree of risk of the object, according to an embodiment of the present disclosure.

In operation S810, the first sensor 1141 of the apparatus 1100 may obtain first sensing data regarding an object near the vehicle 1.

According to an embodiment, the first sensor 1141 may be a sensor that detects an area within the range of human cognitive and perceptual ability. For example, the sensor that detects the area within the range of human cognitive and perceptual ability may include an RGB camera or a sound sensor, but is not limited thereto.

According to an embodiment, the vehicle 1 may obtain sensing data of an object via a sensor, according to pre-set periods during running of the vehicle 1. For example, when the vehicle 1 is running a highway at a high speed, the first sensor 1141 and the second sensor 1142 of the vehicle 1 may operate to obtain sensing data regarding an object at a high frequency. Also, for example, when the vehicle 1 is running at a low speed, the first sensor 1141 and the second sensor 1142 of the vehicle 1 may operate to obtain sensing data regarding an object at a low frequency.

In operation S820, the second sensor 1142 of the apparatus 1100 may obtain second sensing data regarding the object near the vehicle 1.

According to an embodiment, the second sensor 1142 may be a sensor that detects an area outside the range of human cognitive and perceptual ability. For example, the sensor that detects the area outside the range of human cognitive and perceptual ability may include an IR camera, a thermal image camera, a LIDAR sensor, a radar sensor, an ultrasound sensor, and an IR sensor, but is not limited thereto.

According to an embodiment, the vehicle 1 may obtain sensing data of an object via a sensor, according to pre-set periods during running of the vehicle 1. For example, when the vehicle 1 is running a highway at a high speed, the first sensor 1141 and the second sensor 1142 of the vehicle 1 may operate to obtain sensing data regarding an object at a high frequency. Also, for example, when the vehicle 1 is running at a low speed, the first sensor 1141 and the second sensor 1142 of the vehicle 1 may operate to obtain sensing data regarding an object at a low frequency.

In operation S830, the controller 1110 of the apparatus 1100 may obtain a first object recognition possibility of the obtained first sensing data and a second object recognition possibility of the obtained second sensing data.

According to an embodiment, an object recognition possibility indicates a degree to which an object has been correctly recognized, and may be determined based on an actual object and an object identified from sensed data. For example, sensing data corresponding to the actual object may be pre-stored and the object recognition possibility may be determined by comparing the stored sensing data and data sensed from a sensor. Also, the object recognition possibility may denote a value determined through a feature extracted from input data and a parameter of a data base. Also, the object recognition possibility may be determined based on a type of a sensor and an external condition of the vehicle 1.

In operation 840, the controller 1110 of the apparatus 1100 may determine a degree of risk of the object, based on the obtained first and second object recognition possibilities.

According to an embodiment, presence of an object near the vehicle 1 may be determined based on an object recognition possibility and a degree of risk of the object may be obtained. The degree of risk of the object may indicate an affect of the recognized object on the vehicle 1 and the driver of the vehicle 1.

For example, when the presence of the object near the vehicle 1 is definite because the object recognition possibility is high, the degree of risk may be high. However, when the first sensor that detects the area within the human cognitive and perceptual ability detected the object, it is highly likely that the driver of the vehicle 1 also detected the object, and thus the degree of risk may be relatively low. On the other hand, when the first sensor that detects the area within the human cognitive and perceptual ability did not recognize the object and only the second sensor that detects the area outside the human cognitive and perceptual ability recognized the object, the driver of the vehicle 1 is unable to recognize the object despite that the object is present near the vehicle 1 as a risk factor, and thus the degree of risk of the object may be relatively high.

In operation S850, the controller 1110 of the apparatus 1100 may perform a certain function of the vehicle 1, based on the obtained degree of risk of the object.

According to an embodiment, the certain function of the vehicle 1 may be performed based on the obtained degree of risk. For example, the certain function of the vehicle 1 may include at least one of a function of outputting notification information notifying about a risk due to the object 201 and a function of controlling movement of the vehicle 1.

According to an embodiment, when a relatively low degree of risk is determined, a risk to the driver of the vehicle 1 is relatively low, and thus warning about the object or controlling movement of the vehicle 1 may be performed at a pre-set reference time, a type of warning may be limited, or the intensity or frequency of the warning may be relatively low.

On the other hand, according to an embodiment, when a relatively high degree of risk is determined, a risk to the driver of the vehicle 1 is relatively significant, and thus warning about the object or controlling movement of the vehicle 1 may be performed before the pre-set reference time, a type of warning may be various, or the intensity or frequency of the warning may be relatively high.

A type of the output notification information and a type of the controlled movement of the vehicle 1 have been described above with reference to FIG. 7, and thus details thereof will not be provided again.

Figure 9:
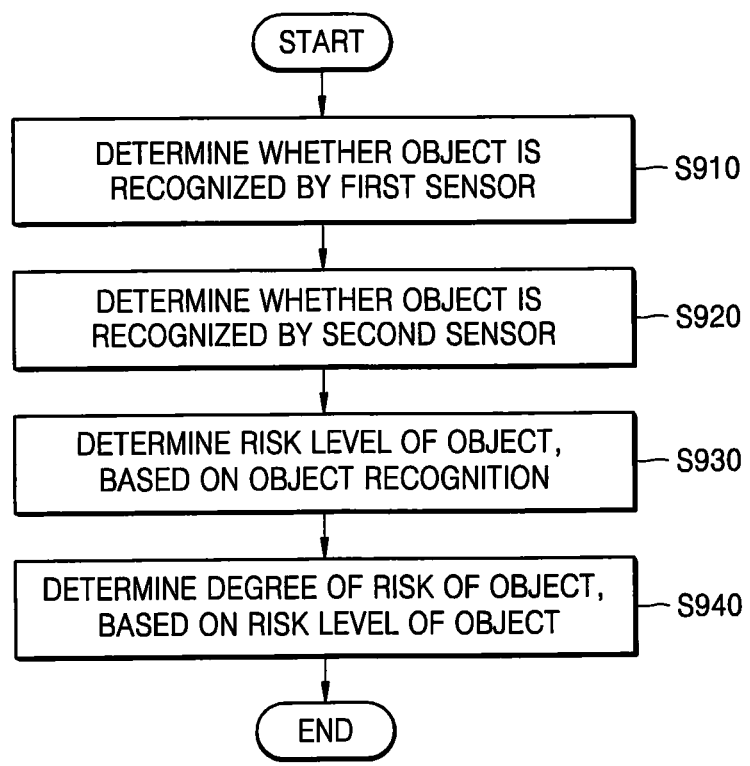
FIG. 9 is a flowchart of a method of determining a risk level of an object, based on an object recognition possibility of sensing data, and determining a degree of risk of the object, based on the risk level of the object, according to an embodiment of the present disclosure.

FIG. 9 is a flowchart of a method of determining a risk level of an object, based on an object recognition possibility of sensing data, and determining a degree of risk of the object, based on the risk level of the object, according to an embodiment of the present disclosure.

In operation S910, it is determined whether an object is recognized by the first sensor, based on a first object recognition possibility.

According to an embodiment, determining of whether an object is recognized by a sensor may be determining whether an object recognition possibility is equal to or greater than a certain threshold value 220. The certain threshold value 220 may be a value indicating that accuracy or possibility of sensing data is equal to or greater than a certain standard. For example, when an object recognition possibility of sensing data is equal to greater than the certain threshold value 220, the controller 1110 of the apparatus 1100 may determine that a sensor did not recognize the object. Meanwhile, the certain threshold value 220 may be a pre-set value or may be a corrected value based on at least one of surrounding situation information or running information.

In operation S920, it is determined whether the object is recognized by the second sensor, based on a second object recognition possibility.

According to an embodiment, determining of whether an object is recognized by a sensor may be determining whether an object recognition possibility is equal to or greater than the certain threshold value 220. The certain threshold value 220 may be a value indicating that accuracy or possibility of sensing data is equal to or greater than a certain standard. For example, when an object recognition possibility of sensing data is equal to greater than the certain threshold value 220, the controller 1110 of the apparatus 1100 may determine that a sensor did not recognize the object. Meanwhile, the certain threshold value 220 may be a pre-set value or may be a corrected value based on at least one of surrounding situation information or running information.

In operation S930, a risk level of the object is determined based on whether the object is recognized by the first sensor and whether the object is recognized by the second sensor.

According to an embodiment, after it is determined whether the object is recognized by the first sensor and the second sensor, the risk level of the object may be obtained based on the recognition.

Detailed operations of obtaining the risk level will be described below with reference to FIG. 10.

In operation S940, a degree of risk is determined based on the determined risk level of the object.

According to an embodiment, the degree of risk may be determined based on the risk level determined as such.

For example, when a degree of risk is determined under a same condition of a running environment (for example, a running speed, a road condition, the weather, a driver's skill, and the like), a degree of risk determined at a relatively low risk level may be lower than a degree of risk determined at a relatively high risk level. In other words, different degrees of risk may be determined according to risk levels determined based on recognition of a sensor, even under same conditions of surrounding environment and running environment (for example, a running speed, a road condition, the weather, a driver's skill, and the like).

Figure 10:
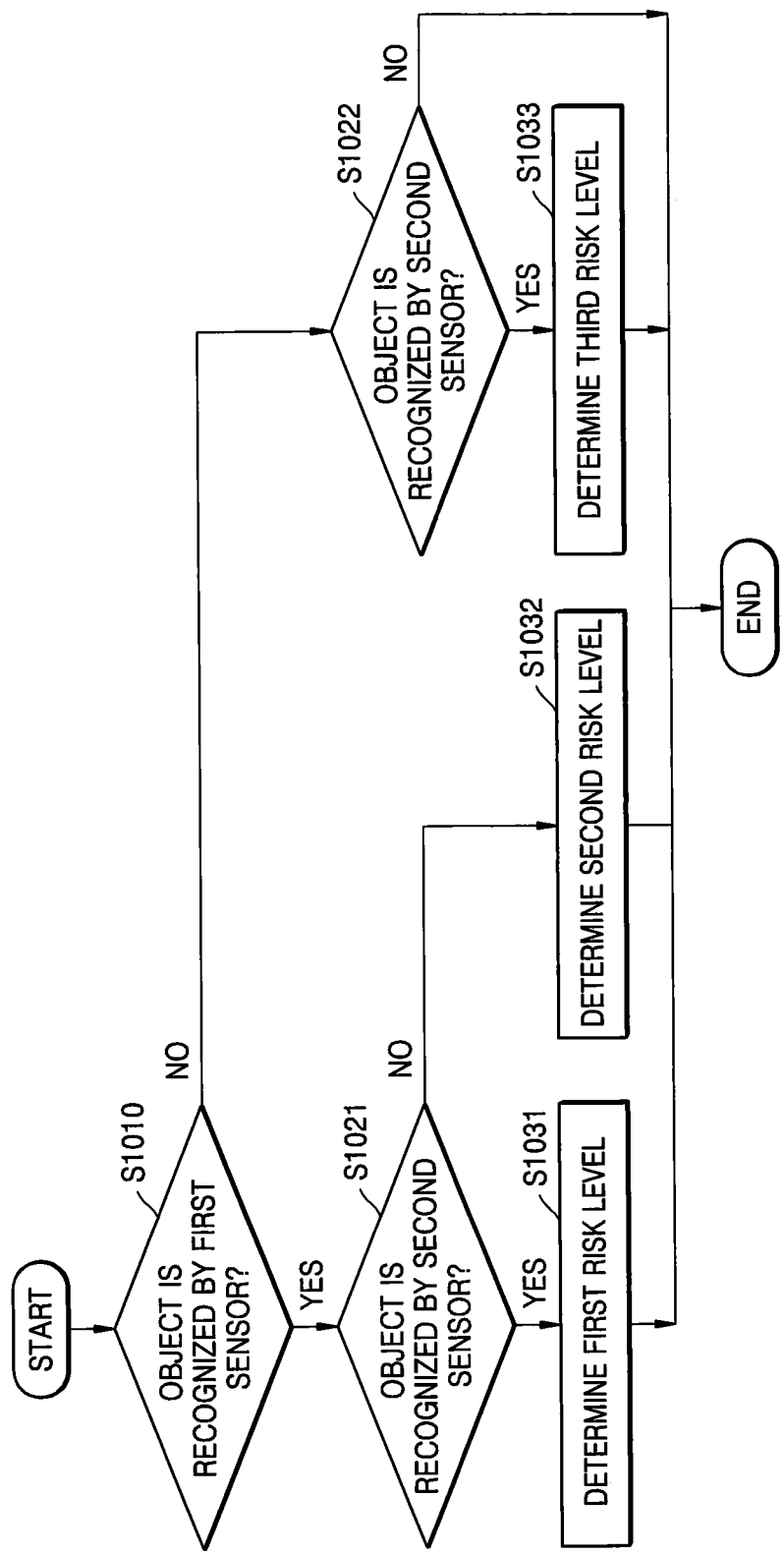
FIG. 10 is a flowchart of a method of determining a risk level of an object, based on whether an object is recognized by each sensor, according to an embodiment of the present disclosure.

FIG. 10 is a flowchart of a method of determining a risk level of an object, based on whether an object is recognized by each sensor, according to an embodiment of the present disclosure.

According to an embodiment, when it is determined that the object is recognized by the first sensor in operation S1010 and determined that the object is recognized by the second sensor in operation S1021, a degree of risk of the object is determined to a first risk level in operation S1031.

For example, when a first object recognition possibility is equal to or greater than a certain threshold value 220 and a second object recognition possibility is equal to or greater than the certain threshold value 220, the driver of the vehicle 1 may be aware of the presence of the object near the vehicle 1 and a sensor of the vehicle 1 may also have recognized the presence of the object. In this case, a degree of risk caused by the presence of the object near the vehicle 1 is obvious, and thus the degree of risk may be determined at a relatively low standard, i.e., a relatively low risk level.

According to an embodiment, when it is determined that the object is recognized by the first sensor in operation S1010 and determined that the object is not recognized by the second sensor in operation S1021, the degree of risk of the object is determined to a second risk level in operation S1032.

For example, when the first object recognition possibility is equal to or greater than the certain threshold value 220 and the second object recognition possibility is smaller than the certain threshold value 220, the driver of the vehicle 1 may be aware of the presence of the object near the vehicle 1, but the second sensor that detects the area outside the range of human cognitive and perceptual ability among the sensors of the vehicle 1 may have not recognized the object near the vehicle 1. In this case, even when the second sensor that detects the area outside the range of human cognitive and perceptual ability did not recognize the object, the driver of the vehicle 1 is able to directly recognize the object, and thus the degree of risk may be determined at an intermediate standard, i.e., an intermediate risk level.

According to an embodiment, when it is determined that the object is not recognized by the first sensor in operation S1010 and determined that the object is recognized by the second sensor in operation S1022, the degree of risk of the object is determined to a third risk level in operation S1033.

For example, when the first object recognition possibility is smaller than the certain threshold value 220 and the second object recognition possibility is equal to or greater than the certain threshold value 220, it may be difficult for the driver of the vehicle 1 to recognize the object near the vehicle 1, but the second sensor that detects the area outside the range of human cognitive and perceptual ability may have recognized the object near the vehicle 1. In this case, because the driver is unable to identify the object with the perceptual ability despite that the second sensor detected the object near the vehicle 1, the degree of risk may be determined at a relatively high level, i.e., a relatively high risk level.

Figure 11:
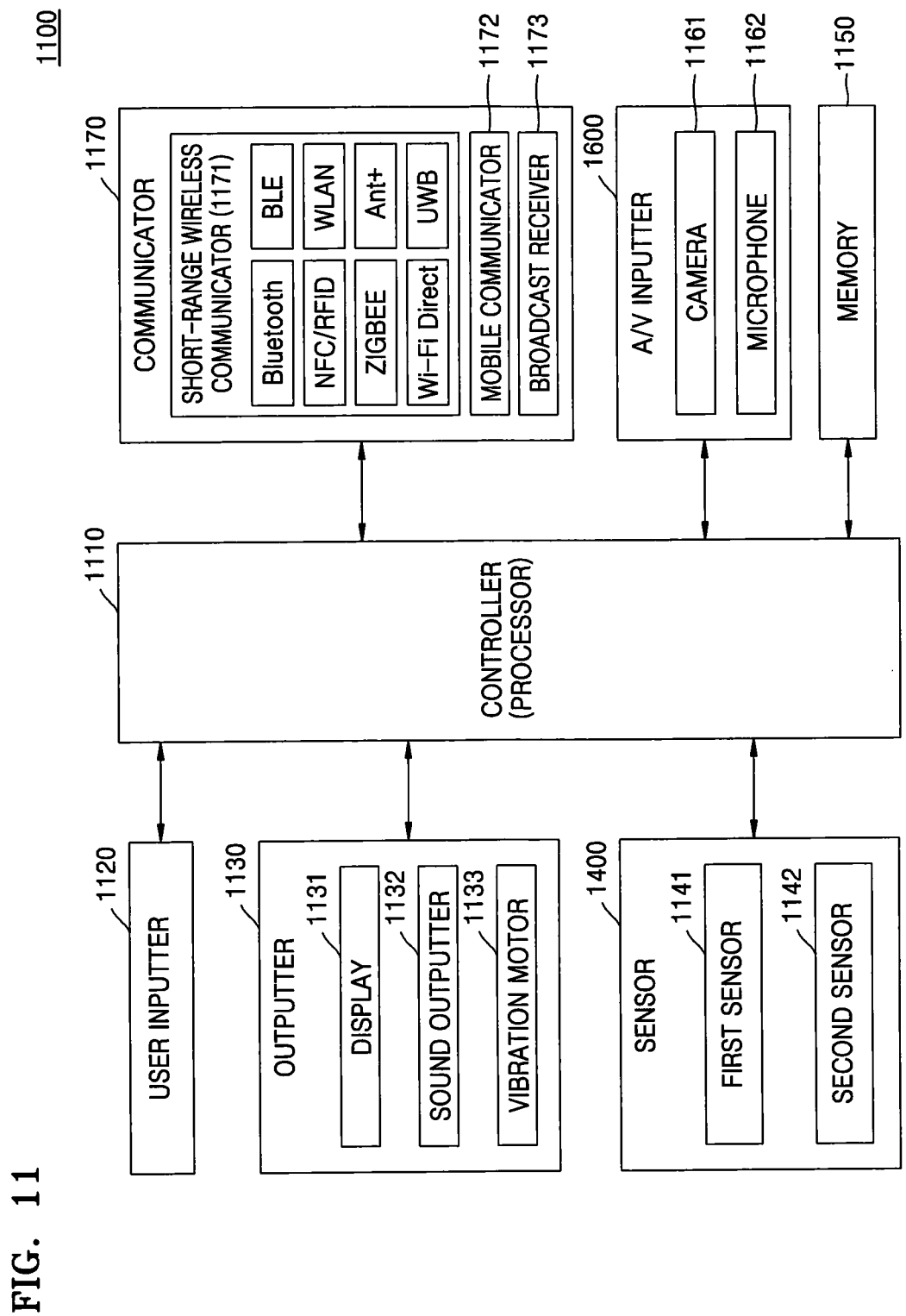
FIG. 11 is a block diagram of an apparatus for recognizing an object, according to an embodiment of the present disclosure.

FIG. 11 is a block diagram of the apparatus for recognizing an object, according to an embodiment of the present disclosure.

Referring to FIG. 11, the apparatus 1100 for controlling a vehicle 1 according to some embodiments may further include the controller 1110, a user inputter 1120, an outputter 1130, a sensor 1140, a communicator 1170, an audio/video (AN) inputter 1160, and a memory 1150.

The controller 1110 may generally control overall operations of the electronic apparatus 1100 described above. For example, the controller 1110 may obtain an object recognition possibility by processing sensing data obtained by the sensor 1140, match object information to the sensing data, based on the object recognition possibility, and store the matched object information in a database of the sensor 1140. Also, the controller 1110 may execute programs stored in the memory 1150 to control the user inputter 1120, the outputter 1130, the sensor 1140, the communicator 1170, and the AN inputter 1160, in overall. Also, the controller 1110 may control at least one of the user inputter 1120, the outputter 1130, the sensor 1140, the communicator 1170, and the A/V inputter 1160 to perform operations of the apparatus 1100 described with reference to FIGS. 1 through 11.

The user inputter 1120 is a unit into which data for controlling the apparatus 1100 recognizing an object is input by the user. For example, the user inputter 1120 may include a key pad, a dome switch, a touch pad (contact capacitance type, pressure resistive type, IR detection type, surface ultrasonic wave conduction type, integral tension measuring type, piezo-effect type, or the like), a jog wheel, a jog switch, or the like, but is not limited thereto.

The outputter 1130 may output an audio signal, a video signal, or a vibration signal, and the outputter 1130 may include a display 1131, a sound outputter 1141, and a vibration motor 1133.

The display 1131 may output and display information processed by the electronic apparatus 1100 for recognizing an object. For example, the display 1131 may display the object information matched to the first sensing data together with the first sensing data.

Meanwhile, when the display 1131 and a touch pad are configured as a touch screen by forming a layer structure, the display 1131 may also be used as an input device as well as an output device. The display 1131 may include at least one of a liquid crystal display, a thin film transistor-liquid crystal display, an organic light-emitting diode, a flexible display, a 3D display, and an electrophoretic display. Also, according to an embodiment of the electronic apparatus 1100 for recognizing an object, the electronic apparatus 1100 may include at least two displays 1131. Here, the at least two displays 1131 may be arranged to face each other by using a hinge.

The sound outputter 1132 may output a sound signal related to a function performed by the electronic apparatus 1100 for recognizing an object (for example, object information notification sound). Such a sound outputter 2141 may include a speaker, a buzzer, or the like.

The vibration motor 1133 may output a vibration signal. For example, the vibration motor 1133 may output a vibration signal corresponding to a type of the matched sensing data. Also, the vibration motor 1133 may output a vibration signal when a touch is input on the touch screen.

The sensor 1140 may detect a state around the electronic apparatus 1100 for recognizing an object and transmit detected information to the controller 1110.

The sensor 1140 may include at least one of an RGB camera, an IR camera, a thermal image camera, a LIDAR sensor, a radar sensor, an ultrasound sensor, or an IR sensor, but is not limited thereto. A function of each sensor may be intuitively deduced from a name by one of ordinary skill in the art, and thus a detailed description will be omitted.

The communicator 1170 may include at least one component enabling the electronic apparatus 1100 for recognizing an object to communicate with a server or a peripheral device. For example, the communicator 1170 may include a short-range wireless communicator 1171, a mobile communicator 1172, and a broadcast receiver 1173.

The short-range wireless communicator 1171 may include a Bluetooth communicator, a Bluetooth low energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra wide-band (UWB) communicator, or an Anti-communicator, but is not limited thereto.

The mobile communicator 1172 may transmit or receive a wireless signal to or from at least one of a base station, an external terminal, and a server, on a mobile communication network. Here, the wireless signal may include various types of data according to exchange of a voice call signal, an image call signal, or a text/multimedia message.

The broadcast receiver 1173 may receive a broadcast signal and/or information related to a broadcast from an external source through a broadcast channel. The broadcast channel may include a satellite channel or a terrestrial channel. According to an embodiment, the electronic apparatus 1100 for recognizing an object may not include the broadcast receiver 1530.

The A/V inputter 1160 is a unit into which an audio signal or a video signal is input, and may include a camera 1161 and a microphone 1162. The camera 1161 may obtain a still image or an image frame of a moving image via an image sensor, in a video call mode or a photographing mode. An image captured through the image sensor may be processed via the controller 1110 or a separate image processor (not shown).

The image frame processed by the camera 1161 may be stored in the memory 1150 or externally transmitted via the communicator 1170. Two or more cameras 1161 may be provided according to an embodiment of the apparatus.

The microphone 1162 may receive an external sound signal and process the external sound signal into electric voice data. For example, the microphone 1162 may receive a sound signal from an external device or a narrator. The microphone 1162 may use various noise removing algorithms for removing noise generated while receiving the external sound signal.

The memory 1150 may store programs for processes and controls of the controller 1110, and store data input to or output from the electronic apparatus 1100 for recognizing an object.

The memory 1150 may include a storage medium of at least one type from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable read-only memory (EE- PROM), a programmable read-only memory (PROM), a magnetic memory, a magnetic disk, and an optical disk.

Some embodiments may also be implemented in a form of a recording medium including instructions executable by a computer, such as program modules being executed by a computer. Computer-readable media may be any available media that can be accessed by a computer and include both volatile and nonvolatile media, removable and non-removable media, or the like. In addition, the computer-readable medium may include both computer storage media and communication media. Computer storage media include both volatile and nonvolatile media or removable and non-removable media implemented in any method or technology for storage of information such as computer-readable instructions, data structures, program modules or other data. Communication media typically include any information delivery media, including computer-readable instructions, data structures, program modules, other data in a modulated data signal such as a carrier wave, or other transport mechanism.

Also, in this specification, the term "unit" may be a hardware component such as a processor or a circuit, and/or a software component executed by a hardware component such as a processor.

The foregoing description of the present disclosure is for illustrative purposes only and it will be understood by one of ordinary skill in the art that various changes and modifications may be made without departing from the spirit or essential characteristics of the present disclosure. It is therefore to be understood that the above-described embodiments are illustrative in all aspects and not restrictive. For example, each component described as a single entity may be distributed and implemented, and components described as being distributed may also be implemented in a combined form.

The scope of the present disclosure is defined by the appended claims rather than the detailed description and all changes or modifications derived from the meaning and scope of the claims and their equivalents are to be construed as being included within the scope of the present disclosure.

The invention claimed is:

1. A method of controlling a vehicle by recognizing, by the vehicle, an object near the vehicle, the method comprising:
    obtaining first sensing data regarding the object near the vehicle, from a first sensor, wherein the object exists outside the vehicle;
    obtaining second sensing data regarding the object, from a second sensor;
    obtaining a first object recognition possibility of the first sensor regarding the object, based on a first result of comparing the first sensing data and sensing data stored in a database;
    obtaining a second object recognition possibility of the second sensor regarding the object, based on a second result of comparing the second sensing data and the sensing data stored in the database;
    obtaining a degree of risk of the object, based on the first object recognition possibility of the first sensor and the second object recognition possibility of the second sensor; and
    performing a certain function of the vehicle, based on the degree of risk of the object.

2. The method of claim 1, wherein the obtaining of the degree of risk comprises:
    determining whether the object is recognized by the first sensor, based on the first object recognition possibility;
    determining whether the object is recognized by the second sensor, based on the second object recognition possibility;
    determining a risk level of the object, based on whether the object is recognized by the first sensor and whether the object is recognized by the second sensor; and
    determining the degree of risk, based on the risk level.

3. The method of claim 2, wherein the determining of the risk level comprises:
    when it is determined that the object is recognized by the first sensor and the object is recognized by the second sensor, determining the risk level to be a first level;
    when it is determined that the object is recognized by the first sensor and the object is not recognized by the second sensor, determining the risk level to be a second level; and
    when it is determined that the object is not recognized by the first sensor and the object is recognized by the second sensor, determining the risk level to be a third level.

4. The method of claim 3, wherein
a degree of risk of the third level is higher than a degree of risk of the second level, and a degree of risk of the second level is higher than a degree of risk of the first level.

5. The method of claim 3, further comprising:
    determining a point of time when the certain function of the vehicle is performed, based on the risk level.

6. The method of claim 1, wherein the obtaining of the degree of risk comprises:
    obtaining at least one of running information of the vehicle and situation information around the vehicle; and
    determining the degree of risk of the object, based on the risk level and the at least one of the running information of the vehicle and the situation information.

7. The method of claim 3, wherein
the certain function of the vehicle comprises at least one of a function of outputting notification information notifying about a risk due to the object and a function of controlling movement of the vehicle.

8. An apparatus for controlling a vehicle by recognizing, by the vehicle, an object near the vehicle, the apparatus comprising:
    a first sensor configured to obtain first sensing data regarding the object near the vehicle, wherein the object exists outside the vehicle;
    a second sensor configured to obtain second sensing data regarding the object; and
    a controller configured to:
        obtain a first object recognition possibility of the first sensor regarding the object, based on a first result of comparing the first sensing data and sensing data stored in a database,
        obtain a second object recognition possibility of the second sensor regarding the object, a second result of comparing the second sensing data and the sensing data stored in the database,
        obtain a degree of risk of the object, based on the first object recognition possibility of the first sensor and the second object recognition possibility of the second sensor, and
        perform a certain function of the vehicle, based on the degree of risk of the object.

9. The apparatus of claim 8, wherein the controller is further configured to:

determine whether the object is recognized by the first sensor, based on the first object recognition possibility;

determine whether the object is recognized by the second sensor, based on the second object recognition possibility;

determine a risk level of the object, based on whether the object is recognized by the first sensor and whether the object is recognized by the second sensor; and determine the degree of risk, based on the risk level.

10. The apparatus of claim 9, wherein the controller is further configured to:

when it is determined that the object is recognized by the first sensor and the object is recognized by the second sensor, determine the risk level to be a first level;

when it is determined that the object is recognized by the first sensor and the object is not recognized by the second sensor, determine the risk level to be a second level; and when it is determined that the object is not recognized by the first sensor and the object is recognized by the second sensor, determine the risk level to be a third level.

11. The apparatus of claim 10, wherein a degree of risk of the third level is higher than a degree of risk of the second level, and a degree of risk of the second level is higher than a degree of risk of the first level.

12. The apparatus of claim 10, wherein a point of time when the certain function of the vehicle is performed is determined based on the risk level.

13. The apparatus of claim 8, wherein the controller is further configured to:

obtain at least one of running information of the vehicle and situation information around the vehicle; and determine the degree of risk of the object, based on the risk level and the at least one of the running information of the vehicle and the situation information.

14. The apparatus of claim 8, wherein the certain function of the vehicle comprises at least one of a function of outputting notification information notifying about a risk due to the object and a function of controlling movement of the vehicle.

15. A computer program product comprising one or more non-transitory computer-readable recording medium having recorded thereon a program which, when executed by at least one processor of a display apparatus, causes the at least one processor to execute a method comprising:

obtaining first sensing data regarding the object near the vehicle, from a first sensor, wherein the object exists outside the vehicle;

obtaining second sensing data regarding the object, from a second sensor;

obtaining a first object recognition possibility of the first sensor regarding the object, based on a first result of comparing the first sensing data and sensing data stored in a database;

obtaining a second object recognition possibility of the second sensor regarding the object, based on a second result of comparing the second sensing data and the sensing data stored in the database;

obtaining a degree of risk of the object, based on the first object recognition possibility of the first sensor and the second object recognition possibility of the second sensor; and performing a certain function of the vehicle, based on the degree of risk of the object.

16. The computer program product of claim 15, wherein the obtaining of the degree of risk comprises:

determining whether the object is recognized by the first sensor, based on the first object recognition possibility;

determining whether the object is recognized by the second sensor, based on the second object recognition possibility;

determining a risk level of the object, based on whether the object is recognized by the first sensor and whether the object is recognized by the second sensor; and determining the degree of risk, based on the risk level.

17. The computer program product of claim 16, wherein the determining of the risk level comprises:

when it is determined that the object is recognized by the first sensor and the object is recognized by the second sensor, determining the risk level to be a first level;

when it is determined that the object is recognized by the first sensor and the object is not recognized by the second sensor, determining the risk level to be a second level; and when it is determined that the object is not recognized by the first sensor and the object is recognized by the second sensor, determining the risk level to be a third level.

18. The computer program product of claim 17, wherein a degree of risk of the third level is higher than a degree of risk of the second level, and a degree of risk of the second level is higher than a degree of risk of the first level.

19. The computer program product of claim 17, further comprising:

determining a point of time when the certain function of the vehicle is performed, based on the risk level.

20. The computer program product of claim 15, wherein the obtaining of the degree of risk comprises:

obtaining at least one of running information of the vehicle and situation information around the vehicle; and determining the degree of risk of the object, based on the risk level and the at least one of the running information of the vehicle and the situation information.

* * * * *